US011620649B2

(12) United States Patent
Meinzer

(10) Patent No.: US 11,620,649 B2
(45) Date of Patent: Apr. 4, 2023

(54) SYSTEMS AND METHODS OF USING THE BLOCKCHAIN TO ALLOW MUSIC ARTISTS TO RAISE AND DISTRIBUTE CAPITAL

(71) Applicant: Jason Meinzer, Santa Monica, CA (US)

(72) Inventor: Jason Meinzer, Santa Monica, CA (US)

(*) Notice: Subject to any disclaimer, the term of this patent is extended or adjusted under 35 U.S.C. 154(b) by 0 days.

(21) Appl. No.: 17/714,101

(22) Filed: Apr. 5, 2022

(65) Prior Publication Data

US 2022/0318793 A1    Oct. 6, 2022

Related U.S. Application Data

(60) Provisional application No. 63/170,619, filed on Apr. 5, 2021.

(51) Int. Cl.
  *G06Q 20/38*   (2012.01)
  *G06Q 10/06*   (2012.01)
  *G06Q 10/0639* (2023.01)

(52) U.S. Cl.
  CPC ..... *G06Q 20/389* (2013.01); *G06Q 10/06393* (2013.01)

(58) Field of Classification Search
  None
  See application file for complete search history.

(56) References Cited

U.S. PATENT DOCUMENTS

| 11,244,032 | B1* | 2/2022 | Nguyen | H04L 9/3239 |
| 2008/0215451 | A1* | 9/2008 | Abbott | G06Q 30/0633 |
| | | | | 705/26.8 |
| 2014/0136346 | A1* | 5/2014 | Teso | G06Q 50/01 |
| | | | | 705/14.72 |
| 2015/0310476 | A1* | 10/2015 | Gadwa | G06Q 30/0226 |
| | | | | 705/14.27 |
| 2020/0005284 | A1* | 1/2020 | Vijayan | G06Q 20/3678 |
| 2020/0052917 | A1* | 2/2020 | Corral | G06Q 20/0655 |
| 2020/0143469 | A1* | 5/2020 | Stewart | H04L 9/0643 |

(Continued)

FOREIGN PATENT DOCUMENTS

KR        2388233 B1 *  4/2022
WO  WO-2018222846 A1 * 12/2018

OTHER PUBLICATIONS

Ingham "NFTs for copyrights: why non-fungible tokens could transform who gets paid from music rights, and how" (2021) (https://www.musicbusinessworldwide.com/nfts-for-copyrights-why-non-fungible-tokens-could-transform-who-gets-paid-from-music-rights-and-how/) (Year: 2021).*

(Continued)

*Primary Examiner* — Sujay Koneru
(74) *Attorney, Agent, or Firm* — Orbit IP, LLP

(57) ABSTRACT

Systems and methods for distributing capital between a musical artist and a fan are provided. In preferred embodiments, the method comprises creating a finite pool of non-fungible tokens (NFTs) wherein each NFT is assigned to a unique artist/song combination. Creating a finite pool of Music Tokens that are distributed to owners of the discrete NFTs based on the performance of the artist or artist/song combination over fixed intervals of time. In preferred embodiments, the distribution of the Music Tokens is at least based on the number of streams a song receives across one or more streaming platforms.

20 Claims, 1 Drawing Sheet

(56) References Cited

U.S. PATENT DOCUMENTS

| | | | | |
|---|---|---|---|---|
| 2021/0097508 A1* | 4/2021 | Papanikolas | ....... | G06Q 20/3678 |
| 2021/0125163 A1* | 4/2021 | Opoku-Ware | ..... | G06Q 20/0658 |
| 2021/0279305 A1* | 9/2021 | Goldston | ................ | G06F 16/61 |
| 2021/0373722 A1* | 12/2021 | Bamford | ............ | H04N 21/4725 |
| 2021/0375247 A1* | 12/2021 | Murphy | ................ | G06F 16/638 |
| 2021/0390531 A1* | 12/2021 | Voorhees | ............. | G06Q 20/065 |
| 2022/0069996 A1* | 3/2022 | Xue | ...................... | H04L 9/3239 |
| 2022/0122062 A1* | 4/2022 | Mayblum | .......... | G06Q 20/3678 |
| 2022/0173893 A1* | 6/2022 | Basu | ................... | H04L 9/3297 |

OTHER PUBLICATIONS

Inghham Having sold music rights to 125 people via NFTS, this blockchain platform is evolving again (2021) (https://www.musicbusinessworldwide.com/having-sold-music-rights-to-125-people-via-nfts-this-music-blockchain-platform-is-evolving-again-2/) (Year: 2021).*

"The Future of Music Industry Funding is Decentralised" (2021) (https://opulous.medium.com/the-future-of-music-industry-funding-is-decentralised-8e47bace3ab7) (Year: 2021).*

* cited by examiner

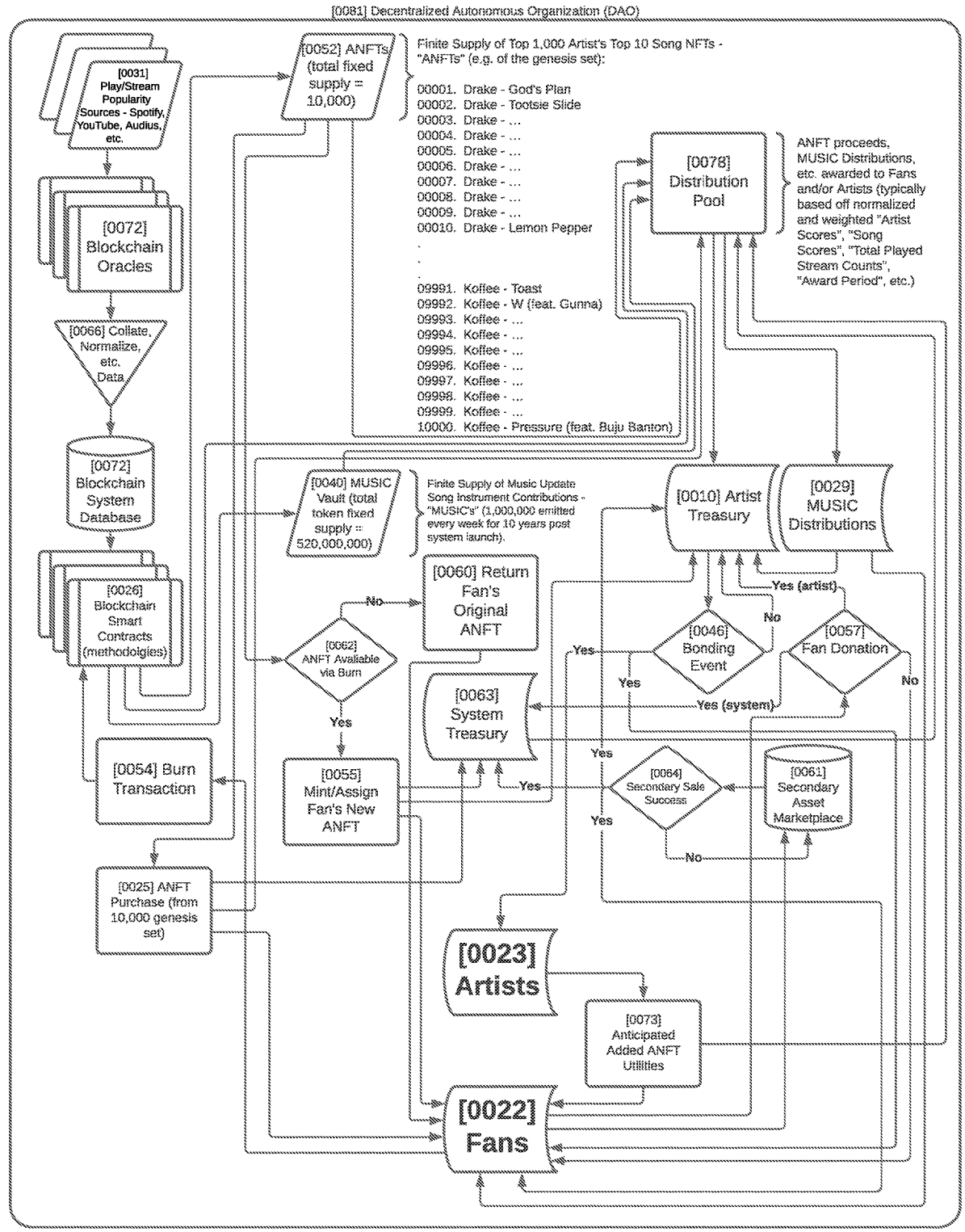

SYSTEMS AND METHODS OF USING THE BLOCKCHAIN TO ALLOW MUSIC ARTISTS TO RAISE AND DISTRIBUTE CAPITAL

RELATED APPLICATIONS

This application claims the benefit of U.S. Provisional Patent Application No. 63/170,619 filed on Apr. 5, 2021, which is hereby incorporated by reference in its entirety.

FIELD

This patent document relates to unique and novel ways of using the blockchain to allow music artists to better raise and distribute capital. In preferred embodiments, the systems and methods use non-fungible tokens and smart contracts to create and maintain a unique link between artists and fans.

BACKGROUND

Currently, music fans are unable to place a financial stake on musical artists that the artist themselves take to form an unprecedented connection between the two where success is shared. Certainly, it would be great if the connection could be done in a way where success is shared. Fans have longed to invest in artists, and artists have long sought additional revenue streams to monetize their music to allow them to continue their creative journeys. Therefore, a system, process and methodology that solves these problems and enables fans and artists to share success is needed.

To simplify this disclosure, more details on the painpoints of the antiquated, backwards and fragmented structure of the music industry as a whole (e.g. artists typically get less than 13% of the approximate $43 billion annual revenue generated—the majority goes to record labels, agents, distributors, streaming platforms, publishers, etc.) are excluded. This disclosure focuses on detailing the specifics of the invention itself. The recent entry of nonfungible tokens (NFTs) on the blockchain will be the catalyst that drives the most disruptive, revolutionary changes to upend the music industry since music streaming began. While the disclosed systems and methods are particularly tailored to the music ecosystem, the systems may be scalable to applications across other industries. For example, the systems and methods taught herein may be used with any piece of digital content where: reads—like blog posts, views—like videos and social media posts, etc. are tracked. However, the described invention will focus on its application to the music industry since the intersection of the blockchain and music presents the greatest opportunity. With that said, it's important to note that while several players have recently emerged in an attempt to solve an array of issues of the music industry's fundamentally flawed structure via more general blockchain-based mechanics, none have been successful.

SUMMARY OF THE EMBODIMENTS

Objects of the present patent document are to provide new and improved systems and methods for the distribution of capital between a fan and a musical artist. In preferred embodiments, the methods of distributing capital between a fan and a musical artist comprises: creating a plurality of artist non-fungible tokens ("ANFT") that is finite and on a blockchain wherein each artist non-fungible token in the plurality of artist non-fungible tokens is associated with a unique artist and song combination.

Once the plurality of ANFTs is created each ANFT may be assigned to a plurality of owners. The assignment is typically in exchange for capital.

In addition to the plurality of ANFTs, a finite pool of music fungible tokens ("Music Tokens") on the blockchain are created. The system monitors the performance of each unique artist and song combination associated with each ANFT for a discrete period of time. A song score and an artist score for each unique artist and song combination is calculated based on a stream count of each artist and song combination on at least one streaming service during the discrete period of time. In some embodiments, the song score and artist score take downloaded/offline data of music and songs into consideration as a factor. In other embodiments, the streaming data from more than one streaming service may be used to calculate the song score and artist score.

Once the song scores and artists scores are calculated, the ANFTs may be ranked based on their performance during the fixed period of time. The top performing ANFTs receive distributions of a portion of the plurality of music fungible tokens based on the song score and the artist score for that discrete period of time.

The process of monitoring the performance of the songs and artists over continuing discrete periods of time and calculating and distributing Music Tokens is repeated until all the Music Tokens are distributed.

In preferred embodiments, a capital investment is received in exchange for an assignment of an ANFT. The capital investment is exclusively available to the artist or a representative of the artist in an artist account. In some embodiments, the capital investment only becomes available to the artist when the artist agrees to a set of terms governing the method.

In preferred embodiments, an ANFT is reassigned from a current unique artist and song combination to a new unique artist and song combination in exchange for a quantity of Music Tokens. In some embodiments, the quantity of Music Tokens exchanged for allowing the transfer of the ANFT to a new artist and song combination are burned and thus, no longer transferable on the blockchain. In some embodiments, a second portion of the Music Tokens exchanged for allowing the transfer of the ANFT to a new artist and song combination is allocated to an artist account.

In some embodiments, a number of artist non-fungible tokens in the plurality of artist non-fungible tokens that may be associated with an individual artist is limited to a threshold amount. This prevents a single artist from dominating the system.

In preferred embodiments, the monitoring of song performance, calculating of song scores and artist scores and distribution of Music Tokens are executed by smart contracts on the blockchain.

In preferred embodiments, a donation from a third-party may be received and the donation contributed to the artist account.

In preferred embodiments, the ANFTs may be sold. Typically, the sale will involve a capital contribution in exchange for an assignment of the ANFT from the owner to a new owner. As part of the sale of any ANFT at least a portion of the capital contribution may be allocated to the artist account.

BRIEF DESCRIPTION OF THE DRAWINGS

FIG. 1 illustrates a logical flow chart of a system that uses the blockchain to allow musical artists to raise and distribute capital.

DETAILED DESCRIPTION OF THE DRAWINGS

The following detailed description includes representative examples utilizing numerous features and teachings, both separately and in combination, and describes numerous embodiments that relate to systems, databases, methods, and machine-readable mediums for use with social media applications. This detailed description is merely intended to teach a person of skill in the art further details for practicing one or more embodiments of the present disclosure and is not intended to limit the scope of the claims. Therefore, combinations of features disclosed in the following detailed description and incorporated documents may not be necessary to practice the teachings in the broadest sense, and are instead taught merely to describe particularly representative examples of the present teachings.

Some portions of the detailed description that follow are presented in terms of algorithms and sequences of operations, which are performed within a computer memory and may be executed as smart contracts as part of a blockchain network. These algorithmic descriptions and representations are the means used by those skilled in the data processing arts to most effectively convey the substance of their work to others skilled in the art. An algorithm or sequence of operations is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated.

It should be borne in mind, however, that the algorithms and/or sequence of operations are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic device, that manipulates and transforms data represented as physical (electronic) quantities within the computer system's registers and memories into other data similarly represented as physical quantities within the electronic device's memory or registers or other such information storage, transmission or display devices.

Systems, processes and methodologies for allowing artists and fans to share success via blockchain-based mechanics are disclosed. Core to the differentiation of the embodiments disclosed herein is the decentralized system's capability to do so more distinctly via a novel platform/partner/licensing/royalty/rightsholder/song/album/etc.-agnostic, NFT-based asset class that is shared by an artist and fan; whose value is tied very specifically to the artist's holistic rise in popularity primarily based off of their sum play i.e. stream counts (relative to other artists) across streaming platforms.

The overarching premise to the methods taught herein is to create a finite pool of non-fungible tokens (NFTs). At any given time, each NFT is tied to a unique artist/song combination ("Artist NFT" or "ANFT"). In addition to the ANFTs, there is a pool of blockchain based tokens ("Music Tokens" or "MUSIC") that act as a type of currency for the System. Generally, these Music Tokens (a.k.a. Music Update Song Instrument Contributions—"MUSIC") may be thought of as similar to Bitcoin®. However, rather than having the completion of transactions on the blockchain control the distribution as is done with Bitcoin, the distribution of the Music Tokens is tied to the success of an artist or an artist/song combination, which is measured by analyzing the active streams on various platforms over a fixed period of time. The ANFTs uniquely associated with the artist/song combinations that are the most successful over the fixed time period are rewarded with distributions of the blockchain based Music Tokens.

With respect to the methods and systems discussed herein, a fan is any individual that buys/owns an ANFT or some fraction thereof. In embodiments where the total number of ANFTs is fixed, the limit of the number of ANFTs become the limit to the number of fans. Of course, there can always be fewer fans as a single fan could own more than one ANFT. In systems where partial shares of an ANFT are available for ownership, there may be more Fans than ANFTs.

In compliment to the fans are the artists. As used herein, the artists are the actual particular/unique artist whose song the ANFT is associated with (e.g. The Weeknd). Depending on value-added features, community consensus, etc., the system may engage with artists to devise custom-tailored mechanisms specific to their content to incorporate into the system's smart contracts. Said additions may add more value to ANFTs associated to that artist (while remaining mindful to not depress the economies of other ANFTs associated to other artists or the system's economy as a whole).

NFTs represent the fundamental structure of the ANFTs. Each ANFT will have several unique characteristics, the primary two being: 1.) they represent a particular artist and 2.) they represent a particular song/track of the artist. However, in different embodiments, many additional traits are possible. The traits of the ANFTs will be leveraged by the system's smart contracts and may include but not be limited to: 1.) generative art characteristics (as may be the case for the originally minted genesis set of ANFTs, in addition to subsequent "Burn" transactions); 2.) dynamic, layered/programmatic visual graphics that may play visual content dynamically off conditions tied to smart contracts (e.g. legally cleared, dynamic internet .gif/video/etc. search results) that, visually, at the very least, provides for exclusive collectible value in and of itself based even just strictly off of the ANFTs visual layer (core to the ANFT is its ability to showcase value from a vast array of perspectives, however, a programmatic visual capability for unique viewing experiences on the ANFT is likely to be key to add to its baseline intrinsic value); 3.) duration a fan has held the ANFT; 4.) a unique serial number (e.g. 1-10,000); 5.) a detailed timestamp; 6.) duration of existence; 7.) duration owned; and 8.) total play/stream counts of a song itself and of the artist as a whole.

ANFTs are a digital representation of a particular song and the musical artist that created that song structured as an NFT with associated "Smart Contracts" on the blockchain. Although any number of ANFTs may be used, in preferred embodiments, the number of ANFTs is fixed throughout the life of the system. In even more preferred embodiments, a finite, total fixed supply of 10,000 are created at system launch and the number of active ANFTs never changes throughout the life of the system. However, any number of ANFTs may be created at the system launch without departing from the scope of the teachings herein. After the genesis ANFT set is minted by the system on the blockchain, they're to be generally made available to the public i.e. fans to purchase. In some embodiments, the system may establish a base price for the genesis ANFT set. In some embodiments, the system may establish an auction-mechanic for each ANFT of the genesis set whereby the open/free market determines the price of each. In some embodiments, the system may enable the artist to establish the price of any ANFT in the genesis set that is associated to them (assuming proper system conditions are met).

Smart contracts are the amalgamation of defined immutable processes on the blockchain that varying elements of the system are bound to. Smart contracts are integral to the overarching content ledger and underlying blockchain-dependent system structure. The smart contracts may provide cryptographically-enforced registries, enforce the rules related to distributions of capital and handle the exchange/manipulation of ANFTs to name a few. As one skilled in the art will appreciate, the smart contracts may be executed when predetermined/defined system conditions are met.

In addition to the ANFTs, the system includes a pool of Music Tokens, which are blockchain-based fungible tokens emitted/distributed by the system to serve as a type of currency for the system. Owners of ANFTs are awarded Music Tokens by the system based on the success of the artist and artist/song combination associated with their ANFT. In preferred embodiments, the system looks at the performance of an artist and/or artist/song combination in fixed timer intervals and awards Music Tokens to ANFT owners based on the performance of the artist and/or artist/song combination during the fixed time period.

As may be appreciated from the teachings herein, the system will have a system launch, which is when the system first goes live. The system launch represents when the system is made commercially available. At that moment, the genesis ANFTs are created on the blockchain and the ANFTs become available for fans of the public to purchase. In addition, system mechanics such as Music Token distributions begins. Ongoing governance of the system to ensure its longstanding value to all stakeholders may incorporate a decentralized governance protocol that enables (and relies upon) all system stakeholders to collectively manage (and as needed, adjust) the system.

In preferred embodiments, once the system has launched, smart contracts are used to determine the quantity of distributions to be awarded at the end of every repeating fixed period of time ("Award Period"). In preferred embodiments, Music Tokens are awarded as the distributions but in other embodiments, other awards may be given or in yet other embodiments, Music Tokens and other awards may be given. The smart contracts may use any methodology to determine which owners of ANFTs deserve distributions at the end of each Award Period. However, a key element to the embodiments taught herein is that the algorithm used by the smart contracts at least use the stream count of artists and/or artist/song combinations from one or more popular streaming services as a factor in the algorithm. In some embodiments, the stream count may be the only factor or at least a major factor in determining distributions. Accordingly, ANFTs associated with a particular artist and/or artist/song combination will receive distributions based on the stream count of that artist and/or artist/song combination for that Award Period.

In preferred embodiments, determining the distributions in any given Award Period is based on the relative performance of any particular artist and/or artist/song combination to other artists and/or artist/song performance.

Although in some embodiments only a single streaming service may be used to determine distributions, in preferred embodiments, a plurality of streaming services may be considered. For example, a Total Played Stream Count ("TPSC") may be used where the total number of played stream counts by listeners in the aggregate for the Award Period across a plurality of streaming platforms (e.g. Spotify, Apple Music, Audius, YouTube, etc.) may be used, in addition to insights from big data platforms and/or aggregators (e.g. Utopia Music), to determine distributions.

In some embodiments, the stream count of an artist across all the artist's songs/tracks may be used to determine distributions. In yet other embodiments, the stream count of a particular song may be used to determine distributions. In preferred embodiments, both the artists stream count and a song's stream count are used to determine distributions for any given Award Period.

In preferred embodiments, the algorithm awards ANFT owners not only on the artist associated to their ANFT, but also/extra for the song itself. As one example, if Susan owns only a single ANFT associated with the artist/song combination of (Drake—God's Plan) and Larry owns only a single ANFT associated to (Drake—Lemon Pepper) and in the given Award Period the only Drake song included in the "Winning Pool" is (Drake—God's Plan), both Susan and Larry would be rewarded with distributions. However, in preferred embodiments, Susan would get a larger distribution than Larry. The importance of the artist or the song in calculating distributions may be different in different embodiments. As just one example, at the end of the Award Period the system could distribute: 1.) 5,000 Music Tokens to each fan holding/owning an ANFT associated to the Top 100 Artists of the Award Period; and 2.) 5,000 Music Tokens to each fan holding/owning ANFT's associated with the Top 100 Songs of the Award Period. In this example, Susan would get a total of 10,000 Music Tokens (5,000 for holding an ANFT associated to Drake plus another 5,000 for holding an ANFT associated to Drake's song God's Plan). In contrast, Larry would get a total of 5,000 Music Tokens (from holding an ANFT associated to Drake, regardless of the fact "Lemon Pepper" was not in the Top 100 songs of the Award Period). All the distributions are determined/reliant on the comprehensive methodology whereby the total Music Tokens distributed for the Award Period is fixed, for example exactly at 1,000,000.

In preferred embodiments, the TPSCs are calculated via smart contracts within the system. In preferred embodiments, the smart contracts are embedded in the blockchain running the system. In some embodiments, the system incorporates smart contracts embedded into the ANFTs themselves whereby the ANFTs have nested NFT capabilities by having their own smart crypto wallets associated to them in order to hold other programmable digital assets (for e.g. Music Tokens and/or other NFTs). In some embodiments, nested NFTs may be used for both practical (e.g. making mechanics of the distribution algorithm more efficient) and value-added (e.g. enabling the ANFTs to have a basket of embedded NFTs inside of them) purposes. These capabilities help to ensure value-added external systems (e.g. other systems that incorporate external NFTs associated to an artist) could latch into the system harmoniously and co-exist while continuing to act autonomously/independently. These added utilities could be associated to "Added ANFT Utilities" as shown in FIG. 1.

As discussed, distributions are given at the end of every fixed time interval or Award Period. The length of time used for the Award Period may be any length of time but is preferably between 6 hours and 1-month. Shorter durations are preferred because it keeps ANFT owner's more interested and engaged, and makes the entire system more dynamic. In preferred embodiments, the Award Period is between 1 day and 1 month. In even more preferred embodiments, the Award Period is 7 days or 1 week, for example 00:00:00:01 Monday, Mar. 29, 2021 through 00:23:59:59 Sunday, Apr. 4, 2021.

In preferred embodiments, owners of an ANFT may only participate in the Award Period on the Monday following the ownership/possession of their ANFT(s), whose ownership is verified on a blockchain. Accordingly, any distribution prior to that would be the property of the prior owner of the ANFT. In some embodiments, the system may allow ANFT owners to elect to bundle accrued distributions associated to their ANFT into a sale of the ANFT to a new owner. In preferred embodiments, owners of an ANFT have first rights to distributions associated with an ANFT they own (assuming proper system conditions are met).

As may be appreciated, the algorithms to determine which ANFT owners receive distributions may vary in different embodiments. Any number of ANFT owners may be awarded during any given Award Period. In preferred embodiments, the algorithm for determining the winners stays consistent throughout the life of the system and is published such that participants know the algorithm and can strategize accordingly. While it is intended for the algorithm to be fixed over the life of the system, it is possible to release updated versions of the system with modifications to the distribution algorithm, e.g. System 2.0. To this end, at the end of every Award Period, a "Winning Pool" of ANFT owners receive distributions.

Although distributions to ANFT owners are at least based on stream count as a factor, numerous other factors may be used to determine distributions during the Award Period. In preferred embodiments, the distribution algorithm incorporates more complex, layered logic that also takes into consideration other facets/properties of the ANFTs. In some embodiments, an ANFT's timestamp is considered. When the timestamp of an ANFT is considered, fans holding older ANFT's may receive a larger distribution relative to others holding newer ANFTs. In the example where the System utilizes ANFT timestamps, fairness is extended to also ensure equitable distributions for fans holding ANFTs not just based on the value they may have purchased their ANFT for (which may be out of the price range of certain fans) but also accounts for those fans that may have only been able to purchase an ANFT at a lower cost but are rewarded for doing so at an earlier time. In some embodiments, the duration a fan has owned an ANFT is considered. When the duration a fan has owned an ANFT is considered, fans who have held an ANFT for a longer duration may receive a larger distribution relative to others that have held an ANFT for a shorter duration. In some embodiments, the actual serial number of an ANFT (1-10,000) is considered. When the serial number of an ANFT is considered, fans who hold a lower serial number may receive a larger distribution relative to others that hold an ANFT with a higher serial number. ANFT serial numbers, when combined with timestamps and duration, could be considered to indicate who the very first fan was for any given artist—which could be a means for the fan to have a unique bragging right i.e. a proof of patronage badge of honor.

At the end of each Award Period, the distribution algorithm may create a song score and an artist score. The song score and artist score are representative values of a song and artists performance under the distribution algorithm during the Award Period respectively. The song scores and artist scores are fed into the systems' smart contracts to ensure a properly weighted distribution of Music Tokens.

In preferred embodiments, the total number of Music Tokens available to the system is fixed. However, in other embodiments, the total number of Music Tokens may be increasing or decreasing at varying rates. The Music Tokens available that have not yet been distributed may be held in the system's Music Update Song Instrument Contribution Vault ("MUSIC Vault"). The Music Tokens may be awarded in a way such that the total number of Music Tokens is awarded after a fixed period of time. For example, if at the system launch all the Music Tokens are held in the MUSIC Vault and all the Music Tokens are supposed to be awarded over a 10 year period and 1,000,000 Music Tokens are awarded every week, then the total number of Music Tokens in the MUSIC Vault at the System launch is 520,000,000.

In preferred embodiments, a fixed number of Music Tokens is awarded at the end of every Award Period. To this end, the length of the Award Period may be divided into the total distribution period and multiplied by the number of Music Tokens awarded each Award Period to determine the total number of Music Tokens.

As just one example, at the end of the Award Period the system could distribute: 1.) 5,000 Music Tokens to each fan holding/owning an ANFT associated to the Top 100 Artists of the Award Period; and 2.) 5,000 Music Tokens to each fan holding/owning ANFTs associated with the Top 100 Songs of the Award Period. All the distributions are determined/reliant on the comprehensive methodology whereby the total Music Tokens distributed for the Award Period is exactly 1,000,000. If this is done every week for 52 weeks a year for 10 years, 520,000,000 Music Tokens start in the MUSIC Vault and are distributed by the system over the course of the 10 year period.

Fundamental to the ultimate goal of the System is to provide Fans and artists both liquidity, value and to help distribute capital between fans and artists more efficiently. To this end, in preferred embodiments, artists who are participating in the system may have a dedicated/held escrow account pool to the artist and/or their delegated teams.

Capital may flow into the artist accounts in any number of ways. As used herein Capital has its plain and ordinary meaning and can include currency, digital assets such as Bitcoin or Ethereum, gold, or any other asset of value and/or utility. In a preferred embodiment, all or a portion of the proceeds from the original sales of ANFTs may be placed in the associated artist's account. In addition, anytime an ANFT is traded or sold, all or a portion of the proceeds may be distributed into the artist's account. In addition, during any given Award Period, artists accounts may receive Music Tokens for being selected as part of the Winning Pool. Other capital allocations to the Artists' accounts may occur for various other reasons as part of the Systems' algorithms.

In preferred embodiments, the proceeds in the artists' accounts are redeemable directly and exclusively to the artists or their associated teams or representatives. While setting aside this pool puts the onus on an artist and/or their delegated teams to work through any legal, licensing, etc. issues with their partners (e.g. distributors, record labels, licensing partners, etc.) before accepting the pool, the very nature of the dedicated, easily accessible pool makes working through these issues easier. Since artists have historically been plagued and stifled to access alternative funding sources i.e. revenue streams given the underlying, antiquated structures of the music industry, the systems describe herein can make the distribution of capital between artists and fans much more efficient.

In some embodiments, capital in the artists' accounts and/or distributions such as Music Tokens associated with an ANFT may be immediately available to the artists/fans respectively. In other embodiments, capital in the artist's account and Music Token distributions may have a state (one of many elements incorporated into the smart contracts) that is by default deemed "Locked". When in the Locked state, capital and/or Music Tokens will not be ultimately fully liquid until the overarching "Bonding Event" occurs. Once the Bonding Event occurs, capital and/or distributed Music Tokens are deemed "Unlocked" i.e. made liquid to artists/fans respectively. Artist retains exclusive rights to redeem assets within their artist accounts once they are Unlocked. Similarly, owners of an AFNT retain exclusive rights to redeem the Music Tokens or other distributions associated with their owned ANFTs. In some embodiments, the system makes the total amount of assets in both Locked and Unlocked states clear to both artists and fans. In embodiments were a Bonding Event controls the liquidity of distributions to ANFT owners, various different events may be used to trigger the Bonding Event. In one embodiment, any capital such as Music Tokens accumulated by a fan's ownership of an ANFT are to remain Locked until the artist themselves formally agree to accept any underlying system agreements.

In embodiments were a Bonding Event controls the liquidity of distributions to artists' accounts, various different events may be used to trigger the Bonding Event. In one embodiment, the Bonding Event to unlock the capital in an artist's account may similarly be the artist's formal agreement to accept any underlying system agreements. In some embodiments, artists may enact the Bonding Event by simply taking the capital in their dedicated artist's account.

In some embodiments, artists may be provided choices as to how the capital is distributed in the system. In one embodiment, the artist can accept their capital with: 1.) fan conditions—whereby the fans have rights to have liquid distributions of Music Tokens; or 2.) without fan conditions—whereby fans do not obtain rights to receive liquid distributions of Music Tokens (in which case, only the artist obtains rights to receive liquid distributions).

Another Bonding Event that may be used by itself or in combination with other bonding events is the distribution of all the Music Tokens. In the example used herein this occurs at the conclusion of the 10th year following system launch. The Bonding Event may be executed regardless of whether or not an artist has agreed to participate in the system. Moreover, a Bonding Event may happen at any time during the life of the system and can occur even after all the Music Tokens have been distributed.

One reason to keep capital locked is to encourage artists to participate in the system. In order to gain access to their Music Tokens, fans will be encouraged to self-market and proactively request artists to enact the Bonding Event. In this context the system intends to incorporate mechanisms for fans to communicate directly with artists through online portals, chats, social media style connections, etc. This may further allow fans to persuade Artists to enact Bonding Events.

Preferred embodiments of the methods and systems taught herein further allow fans and/or third-parties to donate directly to the artists. This may be done by transferring capital in the form of Music Tokens or other capital, directly into an artist's account on the system. In preferred embodiment, 100% of such a donation would go into the artist's account.

At the time the system is initiated and the ANFT's are created on the blockchain, the selection of the artist/song combinations that each ANFT will be associated with may occur in a number of ways. The original genesis set of ANFTs is minted at the time the system is launched. In some embodiments, ANFT's may only be associated with artists that have agreed to participate in the system and agreed to the legalities and/or rules of the system prior to the system launch. In other embodiments, ANFTs may be assigned to any artist at the time the system initiates and artist participation is encouraged through the Bonding Events as explained above. In this example, distributions associated to an ANFT not yet owned/purchased may continue to flow into the associated ANFT and/or artist account and ultimately be redeemable once purchased and/or unlocked (assuming the proper system conditions are met). In some embodiments, the original genesis ANFTs are assigned to those artist or artist/song combination using the same algorithm that calculates the distribution of Music Tokens. This ensures that at the time of system launch, the most valuable artists and artist/song combination from a Music Token standpoint are all incorporated.

In yet other embodiments, the genesis ANFTs may be minted blank whereby fans may purchase a blank ANFT and have a one-time right to assign the ANFT to any not already taken artist/song combination. In some embodiments, this one-time right for assignment may be accomplished by the system depositing the amount of Music Tokens necessary for a single "Burn" transaction into each genesis ANFT's nested smart wallet by leveraging the Added ANFT Utilities as explained above. The initial price of the "blank" ANFTs is controlled by the fact that with each ANFT sold, the best artist/song combinations are being taken. To this end, fans may pay a premium to buy the first minted or earlier minted ANFTs.

During the pendency of the system, fans will likely want to switch from one artist to another or from one song to another. To this end, the system preferably has a way to change the association of any ANFT from one song to another. In preferred embodiments, a fan would have to pay some number of Music Tokens in order to switch their ANFT from one song to another. The spending of Music Tokens to switch an ANFT from one song to another is referred to herein as a "Burn".

The primary Burn action is associated to a fan dispensing/spending the required amount of Music Tokens to be allowed to switch their ANFT from one song to another and/or from one artist to another. In some embodiments, the Music Tokens spent as part of the "Burn" may be used to switch an ANFT artist/song combination to another artist/song combination. In some embodiments, the Music Tokens spent as part of the Burn may be distributed to the artist's account a.k.a. "Artist Treasury", may be destroyed, or may be contributed to a "System Account" a.k.a. "System Treasury", for use in the maintenance, governance and security of the system for all stakeholders. In some embodiments, a percentage of the Music Tokens spent in a Burn are destroyed and the remaining Music Tokens are contributed to the Artist Treasury.

As one example, in a system that distributed 1,000,000 Music Tokens a week over 10 years, 1,000 Music Tokens may be required for a Burn. In other embodiments, other numbers and/or ratios of Music Tokens may be used. In one example, a large majority (e.g. 80%-800) of the 1,000 Music Tokens are forgone/spent/burned/emitted never to be re-activated or replaced again. These Burn events, thereby decrease the supply of Music Tokens making the Music Tokens more valuable and demanded. In this illustration, where 800 Music Tokens are Burned, the remaining 20% may be evenly split and distributed to the System Treasury (10%-100) and the Artist Treasury associated with the ANFT that was released (10%-100).

In some embodiments, donations may also be made by ANFT owners or third parties directly into the Artist Treasury. In some embodiments, donations may also be made by ANFT owners or third parties directly into the System Treasury. Donations into the System Treasury may for e.g. be allocated to win-win reinvestments into the music industry as a whole.

ANFT's are finite such that at any given time there are always the same number of ANFTs and each one is associated with a unique artist/song combination. Accordingly, the only way to change an ANFT to a new artist/song combination is for a fan to earn (or buy) the required number of Music Tokens to complete a change of the artist/song of the ANFT through the Burn process. This allows the fan to switch/update/reassign their ANFT to the new artist/song combination.

In some embodiments, the system enforces limits on the number of ANFT's that may be associated with any single artist. For example, in some embodiments, only 10 ANFT's may be associated with any single artist at any given time. In preferred embodiments, the system checks to ensure that when a fan tries to change an ANFT to a new song, all rules and limits will still be adhered to even after the reassigning of the ANFT. In the examples discussed herein, that would mean the original genesis set of 10,000 ANFT's would be produced (via the system's smart contracts) off of the Top 1,000 Artist's Top 10 songs at the time of system launch.

Burns ensure fans are able to utilize the system to obtain other ANFT's (such as historical artist/song combinations or new, unestablished i.e. less popular artist/song combinations that may not be included in a top performing list). In this context, limiting the fixed (but evolving) ANFT set at any point in time to being restricted to a maximum number of ANFTs associated with any given artist ensures uniqueness and scarcity (a foundational element of ANFT's to ensure the system's ongoing success for all). Moreover, at any single moment, only one ANFT may ever be associated with any particular song, thus making each artist/song ANFT not only scarce, but completely unique and exclusive i.e. a one-of-one asset.

As may be appreciated, elements such as ANFTs or Music Tokens or any other digital item of value may be sold, purchased, bartered or traded on a secondary market. In most embodiments, this secondary market is external to the system. Examples of known secondary markets for the sale of digital assets include but are not limited to: OpenSea, Magic Eden, Coinbase, etc.). In most embodiments, elements such as ANFTs and Music Tokens are designed to be interoperable across such external platforms. As one example, if a fan holds/owns just one ANFT associated to the artist/song combination of "Drake—God's Plan" and wishes to obtain an ANFT associated to "Koffee—Toast" as well, the fan may utilize a secondary asset marketplace to purchase/obtain additional assets linked to the system.

In an alternative example, a fan holds/owns just one ANFT associated to the artist/song combination of "Flamingosis—Finesse (Hey Baby)" and wishes to obtain "Dua Saleh—mOth" instead but realizes no ANFT's associated to "Dua Saleh—mOth" exists. In such a situation, the fan may utilize the system to execute a Burn with their existing ANFT to replace it with one associated to "Dua Saleh—mOth" (assuming the proper conditions are met which ensure its availability. In some embodiments, a maximum threshold of ANFTs associated to an artist exist, therefore in this Burn example there was room for at least one more ANFT associated to Dua Saleh. Once the Burn is executed, the ANFT for "Flamingosis—Finesse (Hey Baby)" is released/forgone. If the fan wants to do the Burn but doesn't have enough Music Tokens to complete the transaction, the fan may go to a secondary asset marketplace to acquire the additional Music Tokens needed.

In some embodiments, when an ANFT is successfully sold from one fan to another on a secondary asset marketplace, a portion of the sale may be programmatically allocated by the system elsewhere. A few examples may be a portion of the proceeds from the sale going to: 1.) The Artist Treasury; and/or 2.) the System Treasury. Allocating a portion of the proceeds from a sale to either the Artist Treasury and/or the System Treasury ensures perpetual incentives/rewards to artists and the ongoing success of the system.

In some embodiments, 5% of the proceeds from the secondary sale of all ANFTs are allocated elsewhere. In an even more preferred embodiment, 2.5% of the proceeds from the sale secondary of an ANFT goes to the Artist Treasury associated with that ANFT and 2.5% goes to the System Treasury.

While a portion of the sale of every ANFT may be syphoned off, in preferred embodiments, nothing is taken out from the sale of Music Tokens. In preferred embodiments, the system notifies/reminds a user regarding any withholding of any portion of an asset during the sale process.

In preferred embodiments, the distribution algorithms and methodology include a mechanism that accounts for a normalization and standardization process. Normalizing the data used to determine distributions of Music Tokens ultimately levels the playing field for all artists when determining/calculating distributions of Music Tokens and/or ANFT proceeds.

As just one example, before each Award Period, a fair weighted basis of sorts may be factored for the artist by for e.g., factoring their historical total stream count and comparing that to their current/applicable total stream count. Using a relative weighting system based in part on an artist's historical stream count will normalize the weight of distributions of Music Tokens relative to other artists. This creates embodiments where distributions are based at least partially on an artist's increasing success rather than current success.

In some embodiments, depending on the desired outcome, the length of time used to determine an artist's historical total stream count can be adjusted. The shorter the duration, for example the previous Award Period, the more responsive the algorithm will be to recent success. The longer the period of time used to calculate an artist's historical total stream count, for example the average over the artist's entire career, the less the algorithm would respond to recent success and the more it would be calibrated on total success.

Absent a normalization mechanism, owners of ANFTs associated to a renown 2021 artist such as Drake would be at an unfair advantage in any given Award Period if he (Drake) were to release a new song (which would obtain massive plays/streams given his pre-established reputation) as compared to an up-and-coming artist such as Koffee whose basis for historical total stream count would be far less in comparison. In some embodiments, normalization mechanisms may incorporate predictive alpha factors, Poisson distribution methods and the like. This normalization across artists is presumed to be accounted for in the holistic methodology which assures fans of a level playing field before Music Tokens are distributed/rewarded, and prevents bad actors from exploiting the system.

The system is predicated on the fan taking a leap of faith of sorts to establish at least the Baseline Intrinsic ANFT Value ("BIANFTV") by the amount of value they obtain/purchase the ANFT(s) for. This fundamental dependency is what triggers the primary value-chain of the system and is therefore, made candidly known and made integral to the system to ensure reciprocity between the fans and the artists up-front of a Bonding Event. The sum amount of proceeds from ANFTs purchases that are attributable to an artist is assumed in any scenario to be redeemable/accepted by the artist provided they trigger the Bonding Event at which point they (the artist) have sole discretion to either keep/redeem their entire Artist Treasury pool with either: 1. zero/no affiliation and/or commitment to any fans owning any ANFTs associated to the artist (in which case the artist collects their Artist Treasury pool essentially as a lump sum donation at that point in time) or 2. a formal agreement/contract with the system that essentially forms the vital bond between them (the artist) and fans thereby enabling fans to have liquid Music Token distributions. Therefore, fan's ANFT purchases being classified essentially as donations of sorts in this context is essential for the system to not be encumbered with Security and Exchange Commission (S.E.C.) laws, regulations, etc. In preferred embodiments, the worst case is that the fan will purchase and hold their ANFT as a prized possession claiming irrefutable proof that they invested in an artist at a certain point of time, etc. as is made immutable on the blockchain which they (the fan) at the least take value in holding for a variety of reasons (social, bragging rights, charitable, speculative, etc.).

Investments in general are often very emotional. In the case of a fan investing in music or a song that's very important and dear to their heart, it is surely so. Fans may hold an ANFT as irrefutable, time stamped proof, akin to a digital wax seal, proving that the fan trusted their ears as talent scouts of sorts by becoming early adopters i.e., patrons in an up and -coming emerging artist (or more established artists). Fans may communicate their early adoption/endorsement of an artist to the public in most any way they like; all while knowing that if/when an artist triggers the Bonding Event, the fan may see exponential upside in the value of their ANFT and proceeds thereof given their newfound connection to the artist.

In preferred embodiments, the system may have a blockchain oracle. The system's blockchain oracle(s) are fed external data which they aggregate, collate, run through algorithms, utilize data normalization and standardization techniques, weighted averages, etc. to ensure the integrity of such data before calculating and determining "Artist Scores" and/or "Song Scores". In some embodiments, the blockchain oracle is embodied by software running on a server. In some embodiments, the system may have a database. The systems database(s) are generally utilized to store and manage data.

In preferred embodiments, the system is designed to allow added utilities of the ANFT's that are win-win between the artist and fan. These Additional Added Utilities are encouraged by the connection between the fan and the artist because incentives are aligned in very positive ways. As just one example, the artist could use their newfound, meaningful connection with the fan as an enriched, promotional feedback loop while offering exclusive value to those fans that hold associated ANFT's not only within the constructs of the system but also outside of it. An example of an outside benefit are platform-agnostic benefits, for e.g., enabling fans with ANFT's to access exclusive content, discounts to future content, exclusive influence and accessibility to their (the artist's) strategic endeavors and insights into their creative process, social recognition, loyalty gifts/merchandise, one-on-one conversations, contests, exclusive Discord servers, collaborative access to the artist's future work, limited edition digital and/or physical work (e.g. limited edition vinyl's), exclusive access to live performances, etc. In some embodiments, progressive artists (e.g. Imogen Jennifer Heap) could have the freedom to even leverage ANFTs (and/or Music Tokens) to offer Fans unique opportunities to invest and/or share monetized proceeds from their other, alternative revenue streams through product assets (e.g. Mi.Mu Glove), mechanisms, platforms (Mycelia), individual stem recordings, etc. outside of i.e. external to the system. In some embodiments, Added ANFT Utilities enhance the longevity of the system's value streams beyond a Music Token distribution schedule which may conclude at the conclusion of the 10th year following system launch. In some embodiments, the system may utilize assets held in treasuries to distribute such beyond a distribution schedule which may conclude at the conclusion of the $10^{th}$ year following system launch.

In yet other embodiments, the system allows artists to contribute their monies/revenues, at their will and discretion to the ANFT in order to increase engagement and value to fans. In some embodiments, the artists can contribute a portion of their IP rights (e.g. royalty revenues from streaming) to their ANFT such that the owner of the ANFT may get multiple distribution streams for owning the ANFT. In some embodiments, artists may programmatically integrate distributions of external tokens they may be affiliated with into the system itself. These added utilities could be associated to "Added ANFT Utilities" as explained above.

In preferred embodiments, varying legal agreements exist within the system. As one skilled in the music business may appreciate, these legal agreements may cover numerous aspects of an artist's involvement with the system, including but not limited to, distributions, fan involvement, royalties and/or contractual provisions with the artist to ensure compliance with their varying partners (distributors, record labels, licensing partners, etc.). Typically, these legal agreements will be executed before accepting their Artist Treasury account, thereby triggering the Bonding Event.

In preferred embodiments, the varying legal agreements help eliminate any/all issues, obstacles, etc. related to gambling laws. This may be similar to how fantasy sports programs address various gambling laws. In addition, in some embodiments, the distribution algorithm for the Music Tokens is amended with enough detail to prove to incorporate enough skill to allow the system to be excluded from the scope of some or all gambling laws. This may be similar to how fantasy sports programs leverage their own sportsbooks to gauge expected performance.

The varying legal agreements and structure of the system preferably also avoid issues related to financial-oriented security tokens, as compared to utility, social, community, platform, transactional, governance, etc. tokens. In some embodiments, the Music Tokens may be implemented with coins such as a stablecoin (e.g. USDC) if necessary, to avoid regulatory and volatility issues.

As may be appreciated, part of the fun for fans is the fan's ability to strategize on new ANFTs to obtain (e.g. via a Burn of an existing ANFT the fan already holds, which they want to replace). In some embodiments, another form of distributions includes proceeds/funds from the sale of ANFTs directly to artists, for example when an artist buys an ANFT associated to themselves. In some embodiments, the system may elect to manage distribution pool disbursements by leveraging protocols such as the BIP70 payment protocol for more complex/nuanced distributions.

In some embodiments, the system may track any number of statistics and/or metrics (both internal-to and external-to the system) and make those available to users or the public as a whole. Some non-limiting examples of statistics and metrics related to artists that the system may track include: 1.) monthly listeners; 2.) NFT floor prices; 3.) unique NFT holders; 4.) NFT trading volume; 5.) Artist Treasury; 6.) web3 activity and 7.) social media activity (e.g., Instagram, Twitter, etc. followers). Any of these statistics or metrics may be considered as part of the distribution algorithm to help more fairly distribute Music Tokens based on an artist's popularity/success during any particular Award Period.

In some embodiments, a leaderboard may be incorporated. The leaderboard may serve as a reference for bragging rights, etc. for both the artists and fans. The leaderboard may show which ANFTs and/or owners ANFT's are leaders based on the distribution of Music Tokens. The leaderboard may have subcategories including leaders of locked and unlocked distributed Music Tokens.

In preferred embodiments, the System is designed to follow a progressively decentralized model which may ultimately work with or be part of a Decentralized Autonomous Organization (DAO). To this end, ANFTs may be owned by DAO's. As one skilled in the art will appreciate, a blockchain-based system following a DAO framework in the web3 ecosystem provides greater efficiencies, transparency, security, governance and ownership as compared to more primitive web2 frameworks (e.g. a web-enabled software application). In some embodiments, a DAO may have access to the System Treasury (which may serve as a community treasury in the context of a DAO). To this end, holdings within the System Treasury may be utilized by the DAO for investments, charitable contributions, etc. in an effort to increase the value of the System Treasury itself to add value to the system as a whole.

In some embodiments, the ANFT may also include metadata that includes a full history of the chain of title of the ANFT such that the first fan a.k.a. holder/owner is recorded all the way to the most recent fan. In some embodiments, this is accomplished via the unique serial number of the ANFT combined with provenance records on a blockchain.

In some embodiments, at system launch, each ANFT is assigned to the respective artist associated with the ANFT such that the chain of title of each ANFT includes the artist as the first owner. Since provenance often provides an increased dimension of value, having the artist always be the first owner may increase value.

In embodiments where the artist is the first owner, the artist maybe gifted their ANFTs at which point it is up to the artist to decide what they are willing to accept for the first sale of the ANFT to a fan. This allows the artist to have a say in the value of their ANFTs up-front of the market determining the value.

As one skilled in the art will appreciate, the system may take advantage of decentralized finance a.k.a. "DeFi" mechanics. In some embodiments, the system may leverage interest, staking, lending, borrowing, yields, collateralization, yield farming and the like with assets associated to the system (e.g. ANFTs and any assets associated to them, Music Tokens, etc.) and system treasury contents.

The invention claimed is:

1. A method for distribution of capital between a musical artist and a fan comprising:
    creating a plurality of artist non-fungible tokens that is finite and on a blockchain wherein each artist non-fungible token in the plurality of artist non-fungible tokens is associated with a unique artist and song combination;
    assigning each artist non-fungible token in the plurality of artist non-fungible tokens to an owner;
    creating a plurality of music fungible tokens on the blockchain;
    monitoring a performance of each unique artist and song combination associated with an artist non-fungible token in the plurality of artist non-fungible tokens for a discrete period of time;
    calculating a song score and an artist score for each unique artist and song combination based on a stream count of each artist and song combination on at least one streaming service during the discrete period of time;
    distributing a portion of the plurality of music fungible tokens to a subset of artist non-fungible tokens in the plurality of artist non-fungible tokens based on the song score and the artist score; and
    repeating the monitoring step, calculating step and distributing step for each additional discrete period of time until all of the plurality of music fungible tokens have been distributed.

2. The method of claim 1, further comprising receiving a capital investment in exchange for an assignment of an artist non-fungible token of a first artist in the plurality of artist non-fungible tokens and making the capital investment exclusively available to the first artist or a representative of the first artist in an artist account.

3. The method of claim 2, wherein the capital investment only becomes available to the first artist when the artist agrees to a set of terms governing the method.

4. The method of claim 1, wherein a second artist non-fungible token in the plurality of artist non-fungible tokens is reassigned from a current unique artist and song combination to a new unique artist and song combination in exchange for a first plurality of music fungible tokens from the plurality of music fungible tokens.

5. The method of claim 4, wherein a first portion of the second music fungible tokens are no longer transferable on the blockchain.

6. The method of claim 5, wherein a second portion of the second music fungible tokens are allocated to an artist account.

7. The method of claim 1, wherein the number of artist non-fungible tokens in the plurality of artist non-fungible tokens that may be associated with an individual artist is limited to a threshold amount.

8. The method of claim 1, wherein the artist score and the song score are based on a total stream count from a plurality of streaming services.

9. The method of claim 1, wherein the monitoring, calculating and distributing steps are executed by smart contracts on the blockchain.

10. The method of claim 2, further comprising receiving a donation from a third-party and placing the donation in the artist account.

11. The method of claim 2, further comprising receiving a capital contribution in exchange for an assignment of an artist non-fungible token in the plurality of artist non-fungible tokens from the owner to a new owner.

12. The method of claim 11, further comprising allocating at least a portion of the capital contribution to the artist account.

13. A method for the distribution of capital between a musical artist and a fan comprising:
- creating a plurality of artist non-fungible tokens that is finite and on a blockchain wherein each artist non-fungible token in the plurality of artist non-fungible tokens is associated with a unique artist and song combination
- assigning each artist non-fungible token in the plurality of artist non-fungible tokens to an owner;
- receiving a capital investment from each owner in exchange for each assignment;
- allocating at least a portion of each capital investment to an artist account;
- creating a plurality of music fungible tokens on the blockchain;
- monitoring the performance of each unique artist and song combination associated with an artist non-fungible token in the plurality of artist non-fungible tokens for a discrete period of time;
- calculating a song score and an artist score for each unique artist and song combination based on a stream count of each artist and song combination on at least one streaming service during the discrete period of time;
- distributing a portion of the plurality of music fungible tokens to a subset of artist non-fungible tokens in the plurality of artist non-fungible tokens based on the song score and the artist score; and
- repeating the monitoring step, calculating step and distributing step for each additional discrete period of time until all of the plurality of music fungible tokens have been distributed.

14. The method of claim 13, wherein the capital investment only becomes available in the artist account when a set of terms governing the method has been agreed to by an artist.

15. The method of claim 13, wherein a second artist non-fungible token in the plurality of artist non-fungible tokens is reassigned from a current unique artist and song combination to a new unique artist and song combination in exchange for a first plurality of music fungible tokens from the plurality of music fungible tokens.

16. The method of claim 15, wherein a first portion of the second music fungible tokens are removed from the blockchain.

17. The method of claim 16, wherein a second portion of the second music fungible tokens are allocated to an artist account.

18. The method of claim 13, wherein the number of artist non-fungible tokens in the plurality of artist non-fungible tokens that may be associated with an individual artist is limited to a threshold amount.

19. The method of claim 1, wherein the artist score and the song score are based on a total stream count from a plurality of streaming services.

20. A method for the distribution of capital between a musical artist and a fan comprising:
- creating a plurality of artist non-fungible tokens that is finite and on a blockchain wherein each artist non-fungible token in the plurality of artist non-fungible tokens is associated with a unique artist and song combination and wherein the number of artist non-fungible tokens in the plurality of artist non-fungible tokens that may be associated with an individual artist is limited to a threshold amount;
- assigning each artist non-fungible token in the plurality of artist non-fungible tokens to an owner;
- receiving a capital investment from each owner in exchange for each assignment;
- allocating at least a portion of each capital investment to an artist account;
- creating a plurality of music fungible tokens on the blockchain;
- monitoring the performance of each unique artist and song combination associated with an artist non-fungible token in the plurality of artist non-fungible tokens for a discrete period of time;
- calculating a song score and an artist score for each unique artist and song combination based on a stream count of each artist and song combination on at least one streaming service during the discrete period of time;
- distributing a portion of the plurality of music fungible tokens to a subset of artist non-fungible tokens in the plurality of artist non-fungible tokens based on the song score and the artist score; and
- repeating the monitoring step, calculating step and distributing step for each additional discrete period of time until all of the plurality of music fungible tokens have been distributed.

* * * * *